C. C. KOPLIN.
GLOBE CHECK VALVE.
APPLICATION FILED MAY 29, 1920.
1,369,444.
Patented Feb. 22, 1921.
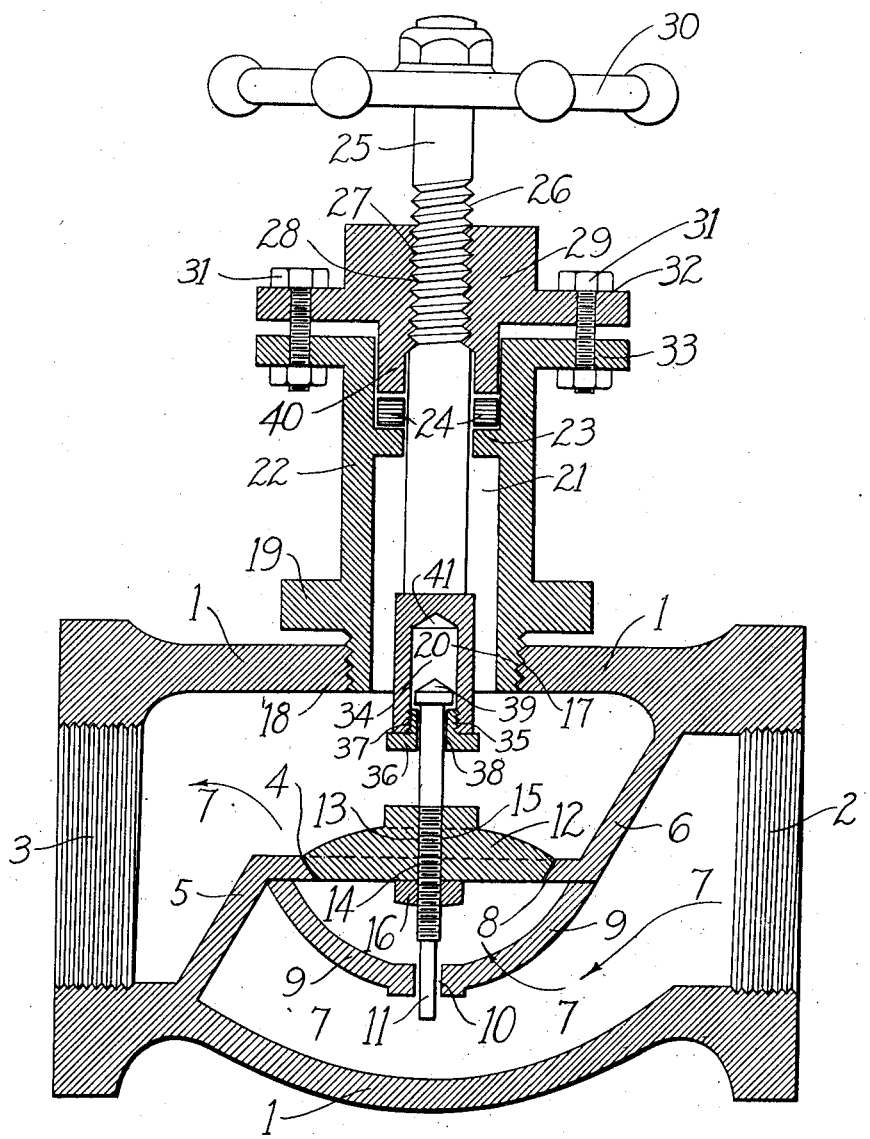
INVENTOR
C. C. Koplin
BY
Adam E. Fisher
ATTORNEY

UNITED STATES PATENT OFFICE.

CHARLES C. KOPLIN, OF BARTLESVILLE, OKLAHOMA.

GLOBE CHECK-VALVE.

1,369,444. Specification of Letters Patent. Patented Feb. 22, 1921.

Application filed May 29, 1920. Serial No. 385,204.

*To all whom it may concern:*

Be it known that I, CHARLES C. KOPLIN, a citizen of the United States, residing in the city of Bartlesville and State of Oklahoma, have invented new and useful Improvements in Globe Check-Valves, of which the following is a specification, reference being had to the accompanying drawings.

The present invention relates to check valves, and more especially to adjustable check valves of the globe form. The primary object is to produce an adjustable check valve of the globe form of construction wherein means are afforded for readily passing the fluid therethrough in one direction, and wherein there is an adjustable check valve so mounted as to prevent the return of the fluid in the opposite direction, and which valve may be readily adjusted or set so as to open to various degrees as may be required, and thus admit a relatively greater or lesser amount of fluid.

A further object is to provide such a valve in a form permitting the same to be either permanently closed or permanently opened, as desired.

A further object is to produce this apparatus in a simple and efficient form best adapted to carry out the purposes intended.

In the drawings:

The figure shows a longitudinal sectional view of the valve.

Referring more particularly to the drawings, my invention in its preferred construction consists of an outer globular casing 1, having the ingress and egress ports 2 and 3 located through opposite sides thereof. A circular valve opening 4 is formed by the interior walls 5 and 6; the wall 5 being spaced inwardly and adjacent the lower side of the egress port 3 and the wall 6 adjacent the upper side of the ingress port 2, said walls being formed to meet at a medial point so as to form an interior fluid conduit 7 connected through the valve opening 4. The annular beveled valve seat 8 is formed around the opening 4. A depending rib 9 is extended across the valve opening 4 from side to side, said rib being pierced with the vertical bore 10 adapted to slidingly receive the lower end of the valve stem 11, and thus act as a guide for the valve. The valve 12 is formed to snugly seat upon the valve seat 8 and is adapted to open upwardly therefrom. The valve 12 is adjustably mounted upon the valve stem 11. For this purpose it is pierced centrally with a bore 13, which bore is screw threaded, as shown at 14, and is thus adapted to mesh with the threads 15 cut upon the valve stem 11. A lock nut 16 is provided, and thus the valve 12 may be locked in any required position. The upper part of the casing 1 is provided with an annular opening 17 which is screw threaded, as shown at 18, and within this opening is mounted the upper parts of the valve mechanism. For this purpose the base plate 19 is screw threaded, as shown at 20, so as to mesh with the threads 18. The base plate 19 is pierced with a central vertical aperture 21 and surrounding this aperture and extending upwardly is the rigidly mounted housing 22. This housing 22 is formed with a medial, integral, inwardly extended annular wall 23 adapted to engage a packing ring 24 disposed at the upper side thereof. A screw shaft 25 is passed downwardly through the housing 22 into the interior of the casing 1. The upper end of this screw shaft is screw threaded, as shown at 26, so as to mesh with the threads 27 cut around the vertical bore 28 of the top plate 29. The top plate 29 has the lower sleeve portion 40 adapted to slide within the housing 22 and press upon the packing ring 24, thus insuring a tight joint. The screw shaft 25 is provided with a suitable handle 30. Thus the screw shaft may be readily adjusted upwardly or downwardly through the housing 22 by merely turning the handle 30. The top plate 29 is bolted to the housing 22 by means of the bolts 31 extended through the ears 32 and 33 of the top plate 29 and the housing 22, respectively. The lower end of the screw shaft 25 is chambered out, as shown at 34, and the lower end of this chamber is screw threaded, as shown at 35. A stop 36 is provided and formed with threads 37 adapted to mesh with the threads 35 of the chamber 34. The stop 36 is pierced with a central vertical bore 38 adapted to slidingly receive the upper end of the valve stem 11. The upper end of the valve stem 11 is provided with a head 39 adapted to engage the upper portion of the stop 36 as the valve stem 11 reciprocates up and down. Thus the valve 12 may move upwardly until the head 39 strikes the upper end 41 of the chamber 34, and may move downwardly until it strikes its seat 8. Thus, by adjusting the valve 12 up or down upon its stem 11, as explained, or by turning the screw shaft 25 up or down, the capacity of the opening 4 may be readily regulated so as to increase or diminish the quantity of passing fluid. Of course, it is apparent that fluid can pass only in one direction, as indicated by the arrow, since a reverse movement of the fluid would seat the valve 12 and close the opening 4. Also the valve 12 may be permanently seated and the opening 4 closed, by turning down the screw shaft 25 until the valve 12 is permanently seated. Similarly the valve may be permanently held open by turning the screw shaft 25 upwardly until the valve 12 permanently clears its seat.

What I claim to be new and patentable is:

1. A globe check valve comprising a globular casing; a port of ingress and a port of egress cut through the walls of the casing; an interior wall spaced inwardly adjacent the lower side of the egress port and a similar wall adjacent the upper side of the ingress port, said walls being arranged to form an interior conduit connected by a circular valve opening having a valve seat; a valve formed to snugly seat upon said valve seat; a valve stem adjustably mounted through the center of said valve, the upper end thereof being formed to a head; a depending rib extended across the valve opening, said rib having a central vertical bore to slidingly receive the lower end of the valve stem; a screw shaft adjustably mounted through the casing perpendicularly to the valve and immediately over the valve stem, the lower end of the shaft being chambered out to slidingly receive the head of the valve stem and permit same to oscillate vertically therein; and a handle mounted at the upper outer end of said screw shaft for manipulating same.

2. A globe check valve comprising a globular casing; a port of ingress and a port of egress cut through the walls of the casing; an interior wall spaced inwardly adjacent the lower side of the egress port and a similar wall adjacent the upper side of the ingress port, said walls being arranged to form an interior conduit connected by a circular valve opening having a valve seat; a valve formed to snugly seat upon said valve seat; a valve stem adjustably mounted through the center of said valve, the upper end thereof being formed to a head; a depending rib extended across the valve opening, said rib having a central vertical bore to slidingly receive the lower end of the valve stem; a screw shaft adjustably mounted through the casing perpendicularly to the valve and immediately over the valve stem, the lower end of the shaft being chambered out to slidingly receive the head of the valve stem and permit same to oscillate vertically therein; a handle mounted at the upper outer end of said screw shaft for manipulating same; and a housing and packing mounted over said screw shaft at the point of entrance into the casing to prevent leakage.

3. A globe check valve comprising a globular casing; a port of ingress and a port of egress cut through the walls of the casing; an interior wall spaced inwardly adjacent the lower side of the egress port and a similar wall adjacent the upper side of the ingress port, said walls being arranged to form an interior conduit connected by a circular valve opening having a valve seat; a valve formed to snugly seat upon said valve seat; a valve stem adjustably mounted through the center of said valve, the upper end thereof being formed to a head; a depending rib extended across the valve opening, said rib having a central vertical bore to slidingly receive the lower end of the valve stem; a screw shaft adjustably mounted through the casing perpendicularly to the valve and immediately over the valve stem, the lower end of the shaft being chambered out to slidingly receive the head of the valve stem and permit same to oscillate vertically therein; a handle mounted at the upper outer end of said screw shaft for manipulating same; a housing and packing mounted over said screw shaft at the point of entrance into the casing to prevent leakage; and threads cut upon the shank of the screw shaft, adapted to mesh with threads cut around the bore of the housing, as means for raising or lowering said screw shaft.

CHARLES C. KOPLIN.

Witnesses:
 PAUL S. WEBB,
 L. A. RUFFNER.